United States Patent
Charbonneau

(10) Patent No.: US 7,526,654 B2
(45) Date of Patent: Apr. 28, 2009

(54) METHOD AND SYSTEM FOR DETECTING A SECURE STATE OF A COMPUTER SYSTEM

(76) Inventor: Marc Charbonneau, 23 Terrace Sauva, Ottawa, Ontario (CA) K0A 1M0

( * ) Notice: Subject to any disclaimer, the term of this patent is extended or adjusted under 35 U.S.C. 154(b) by 153 days.

(21) Appl. No.: 09/977,203

(22) Filed: Oct. 16, 2001

(65) Prior Publication Data

US 2003/0074567 A1 Apr. 17, 2003

(51) Int. Cl.
*H04L 9/32* (2006.01)
(52) U.S. Cl. .................... 713/188; 713/182; 726/4; 726/5
(58) Field of Classification Search .......... 713/186, 713/165, 167, 176
See application file for complete search history.

(56) References Cited

U.S. PATENT DOCUMENTS

| | | | |
|---|---|---|---|
| 5,421,006 A | 5/1995 | Jablon et al. | |
| 5,436,972 A | 7/1995 | Fischer | |
| 5,448,045 A | 9/1995 | Clark | |
| 5,608,801 A | 3/1997 | Aiello et al. | |
| 5,919,257 A * | 7/1999 | Trostle | 713/200 |
| 5,944,821 A * | 8/1999 | Angelo | 713/200 |
| 6,044,155 A | 3/2000 | Thomlinson et al. | |
| 6,047,242 A | 4/2000 | Benson | |
| 6,105,072 A * | 8/2000 | Fischer | 719/315 |
| 6,138,236 A * | 10/2000 | Mirov et al. | 713/200 |
| 6,160,734 A | 12/2000 | Henderson et al. | |
| 6,226,749 B1 | 5/2001 | Carloganu et al. | |
| 6,378,072 B1 * | 4/2002 | Collins et al. | 713/187 |
| 6,470,450 B1 * | 10/2002 | Langford et al. | 713/182 |
| 6,694,434 B1 * | 2/2004 | McGee et al. | 713/189 |
| 6,853,988 B1 * | 2/2005 | Dickinson et al. | 705/75 |
| 7,216,232 B1 * | 5/2007 | Cox et al. | 713/176 |
| 7,391,865 B2 * | 6/2008 | Orsini et al. | 380/201 |

* cited by examiner

*Primary Examiner*—Pramila Parthasarathy
(74) *Attorney, Agent, or Firm*—Perkins Coie LLP

(57) ABSTRACT

Disclosed is a method for detecting unauthorized applications in execution within a computer system, such as for instance one of a Trojan horse application and a virus, prior to providing security data from a trusted source. According to the instant invention, a security application computes a hash value in dependence upon predetermined data in system memory and compares said computed hash value to a trusted hash value that was obtained when the system was in a verified secure state. The data is provided from the trusted source to an application in execution on the computer system only if the computed hash value and the trusted hash value are indicative of a same trusted state.

76 Claims, 8 Drawing Sheets

METHOD AND SYSTEM FOR DETECTING A SECURE STATE OF A COMPUTER SYSTEM

FIELD OF THE INVENTION

The present invention relates generally to computer data security. More particularly, the present invention relates to a method and system of maintaining and evaluating system security to determine whether a malicious computer application such as one of a virus and a Trojan horse application is present in the system.

BACKGROUND OF THE INVENTION

There are currently many needs that must be addressed when implementing a system and method for maintaining security within a computer network. One such need is protection from computer code that might compromise the security of the system. An example of this type of program is a "virus," which is a program that loads itself into system memory and then embeds itself into legitimate software so that it can continue to replicate itself. Another example of malicious code is a "Trojan horse," which is a program that appears to be one application such as a simple game or utility but in fact hides its real purpose from the user. Typically a Trojan horse writes itself into the system programming so that it runs every time the computer starts and does not make its presence known to the user. In most cases a Trojan horse is designed for specific attacks on a computer system. Common examples include: opening up access ports to the computer and possibly running system capturing software that allows a hacker to access remotely the computer system by commandeering the mouse, keyboard and screen of the user, or capturing all the keystrokes a user enters and saving them in a file or transmitting them to a location from which the originator of the Trojan horse accesses same.

Although there commonly exists software that scans each application at load time and checks for the existence of viruses in execution, this software typically relies on of the following technique: scanning for known virus code found in an internal database that must be updated frequently.

Unfortunately, most prior art systems do not protect against man-in-the-middle type attacks. A man-in-the middle attack is a security breach formed when a system or application disposes itself between two parties to a secure communication. For example, a Trojan horse application is interposed between applications in the computer system. The Trojan horse application is for intercepting keystrokes and other security data that are provided between applications within the computer system and for recording or e-mailing the intercepted keystrokes and other security data to the hacker.

In order to prevent locally executing applications, such as for instance a Trojan horse application, from affecting key data, one prior art method is to provide the computer system with a secure token for performing cryptographic functions. The token does not accept programming code and, as such, cannot be tampered with. Further, the token provides no access to keys stored therein, such that security of the key data is assured. Unfortunately, the man-in-the-middle attack is still possible wherein data is intercepted when not encrypted either before being provided to the token or upon receipt therefrom.

Fischer, in U.S. Pat. No. 5,436,972 teaches a method for preventing inadvertent betrayal by a trustee of escrowed digital secrets. In a definition phase, the user defines an escrow record that provides self-identification data together with encrypted password data. The user is prompted to voluntarily escrow password or other secret information for later retrieval by entering a series of information uniquely describing them. After unique identification data has been entered, the user is asked to select a password to protect the system. Thereafter, all the personal identifying data, together with the password, is encrypted with the trustee's public key and is stored, for example, in the user's computer as an escrow security record. The password is then used to encrypt all data on the user's disk. If the user forgets the password, a retrieval phase of the method is performed. The trustee utilizes documentary evidence presented by the alleged legitimate user and determines whether such evidence matches with the previously encrypted escrow information stored in the escrow record created by the user. If they agree, then the trustee has confidence that the true owner is making the request, and that revealing the secret key will not betray the owner's interest. Unfortunately, the method disclosed by Fischer does not prevent a Trojan horse application, when resident in the user's system, from intercepting the private key and recording it.

U.S. Pat. No. 5,919,257 issued Jul. 6, 1999 in the name of Trostle teaches a networked workstation intrusion detection system. During pre-boot—a period of time prior to initiating operation of the workstation operating system, a networked workstation performs an intrusion detection hashing function on selected workstation executable program(s). A hash function is a mathematical transformation that takes a message of arbitrary length (e.g., the selected executable programs) and computes from it a fixed length number (i.e., the computed hash value). A computed hash value calculated by the hashing operation is compared against a trusted hash value that is downloaded from a server in order to detect unauthorized changes to the selected workstation executable programs. The server can compute the trusted hash value(s) by performing the hashing function on trusted copies of the selected workstation executable programs stored in the server. Alternatively, the server may include a database of trusted hash values each uniquely associated with an executable program.

The workstation executes the hashing function on the selected executable programs stored in workstation memory (disk or RAM) to calculate a computed hash value. The workstation compares this value with the trusted hash value downloaded from the server to determine if any illicit changes have been made to the selected executable programs. If changes are detected, the user and/or the network system administrator is notified in order to take corrective action. Otherwise, the initialization proceeds and the workstation boot process continues. Alternatively, a computed hash value may be calculated separately for each selected workstation executable program, and compared against the trusted hash value downloaded from the server for that executable program. Advantageously, unauthorised changes to executable programs are detected using the prior art method. Unfortunately, it is necessary that the workstation be connected to a server or to other secure hardware from which it can obtain a trusted hash value for comparison. Further, the method compares hash values representing known or authorized executable files, and therefore can only detect Trojan horse applications that are appended to known executable files, and then only if that executable file is included in the comparison.

It would be advantageous to provide a method of reducing the efficacy of a man-in-the-middle security attack.

OBJECT OF THE INVENTION

It is an object of the invention to provide a method and system for detecting unauthorized applications prior to providing security data from a trusted store.

It is an object of the invention to provide a method and system for detecting locally executing Trojan horse applications and viruses prior to providing security data from a secure source.

SUMMARY OF THE INVENTION

In accordance with the invention there is provided a method of detecting unauthorized executable programs resident in a computer system memory comprising the steps of:
  a) receiving a trusted hash value representative of a hash value for generation by a predetermined hashing process of predetermined data stored in memory within the computer system if an unauthorized executable program is other than resident in the computer system;
  b) hashing the data stored in memory within the computer system using the predetermined hashing process to determine a computed hash value; and
  c) comparing the computed hash value and the trusted hash value to determine differences between the data and the predetermined data.

In accordance with an embodiment of the instant invention there is provided is a method of detecting unauthorized executable programs resident in a computer system comprising the steps of:
  a) providing a trusted security application executable on a processor of the computer system for determining a hash value using a predetermined hashing process of predetermined data existing in memory within the computer system;
  b) hashing the data existing in memory within the computer system using the predetermined process to determine a hash value;
  c) digitally signing the hash value to provide a trusted hash value; and
  d) retrievably storing the trusted hash value,
    wherein the hash value is determined absent an unauthorized executable program being present within the computer system; and
    wherein the predetermined data relates to programs in execution on the processor of the computer system.

BRIEF DESCRIPTION OF THE DRAWINGS

The invention will be readily understood by the following description of preferred embodiments, in conjunction with the following drawings, in which:

FIG. 2 shows a simplified code block diagram according to a first embodiment of the instant invention for use with the computer system of FIG. 1a;

DETAILED DESCRIPTION OF THE INVENTION

The instant invention is concerned with an implementation of a system, using trusted secure software applications, for the purpose of maintaining security within one of a computer system and a network of computer systems, such that an end user can run un-trusted applications. According to the instant invention, a secure state of a computer is verified in an initial state and the verification data is then used to assure the secure state of the computer. A trusted hash value, which is indicative of the secure state of the computer system, is generated, digitally signed and retrievably stored for later use in assessing a current state of the computer system.

Figure 1A:
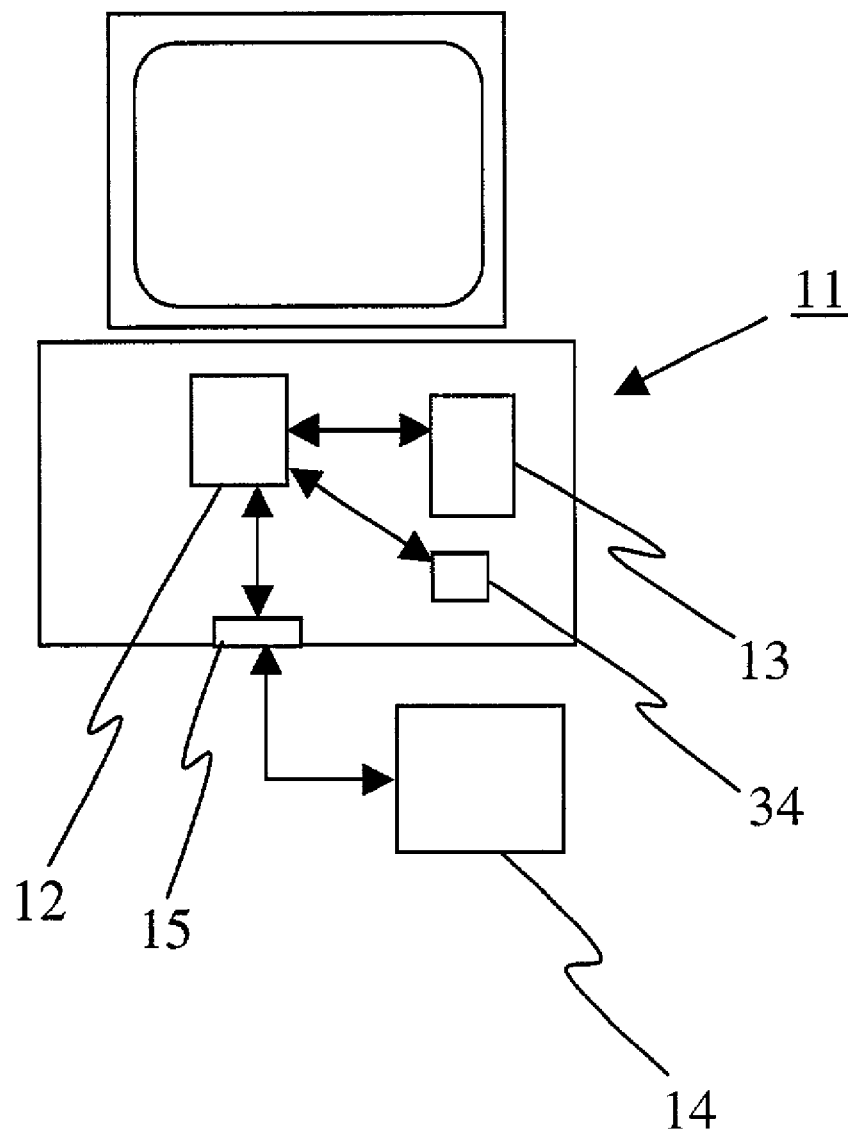
FIG. 1a shows a simplified block diagram of a prior art computer system for use with the instant invention.

Referring to FIG. 1a, shown is a simplified block diagram of a prior art computer system 11. The computer system 11 includes a processor 12 in electrical communication with each of a memory storage device 13 and a volatile memory circuit 34. Memory storage device 13 in the form of an internal disk drive, is for storing program code that is executable on processor 12, for example a word processor application and a database application. Of course, related memory management files, such as for instance dynamic linked library (DLL) files, are also stored within memory storage device 13. Additionally, data that has been processed by the at least an application is stored within memory storage device 13. Volatile memory circuit 34, for instance a random access memory (RAM) bank, is for storing program code and related memory management files during execution of the code on processor 12. Processor 12 is also in electrical communication with an authentication information input device 14, such as for instance a fingerprint scanner, via an interface 15. As will be obvious to one of skill in the art, input device 14 is optionally one of a plurality of well known other authentication input devices, including: a keyboard, a retinal scanner, a voice recognition system and a magnetic card reader.

Figure 1B:
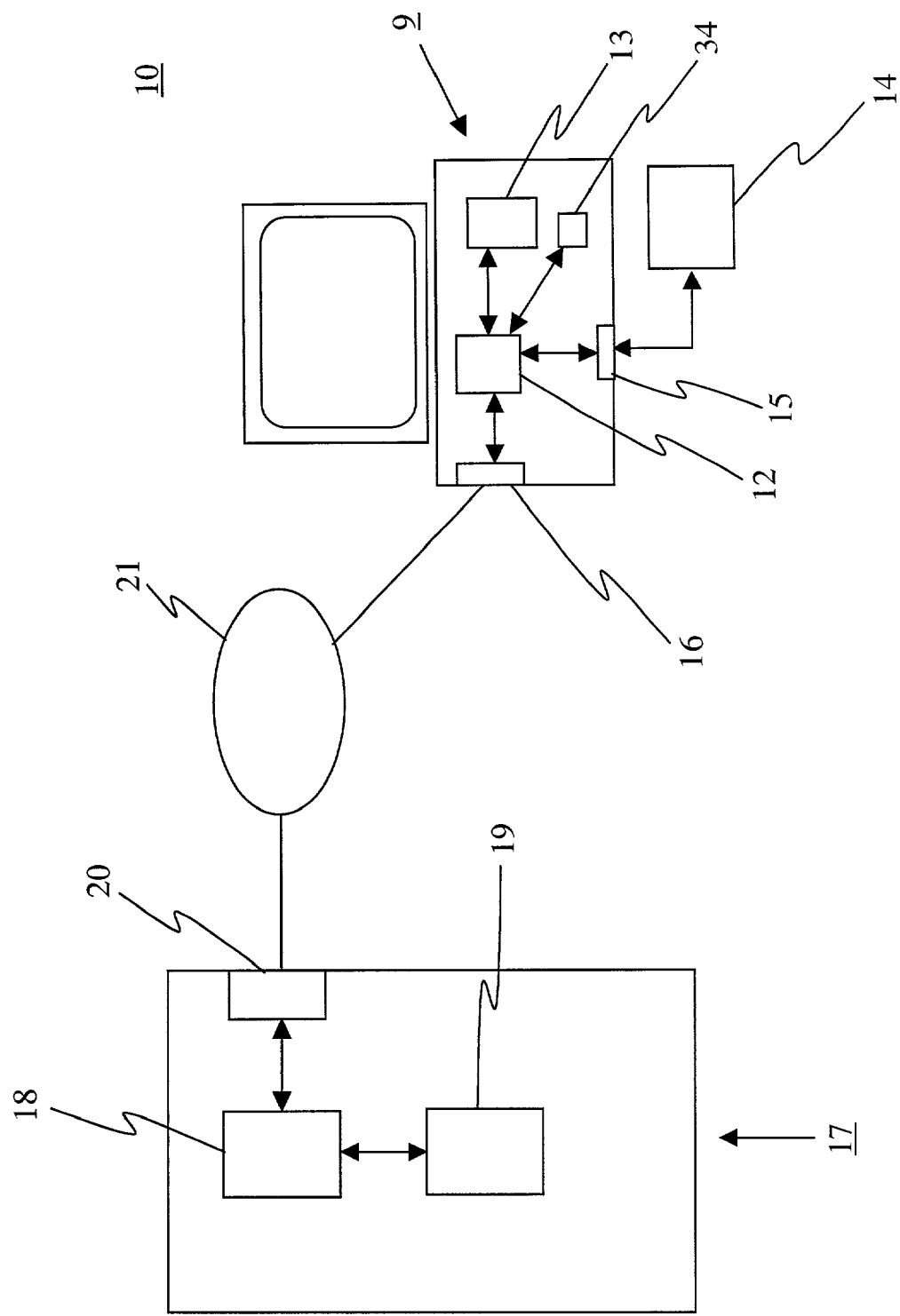
FIG. 1b shows a simplified block diagram of a prior art networked computer system for use with the instant invention.

Referring now to FIG. 1b, shown is a simplified block diagram of a prior art client/server system 10 comprising a computer system 9 in electrical communication with a secure server 17 via a communication network 21. Those elements that are identical to elements of FIG. 1a have been assigned identical reference numerals, and their discussion has been omitted for the sake of brevity. The computer system 9 includes an input/output port 16 in electrical communication with processor 12 for exchanging data with the secure server 17 via the communication network 21. The secure server 17 includes a processor 18 in electrical communication with a port 20 and with a memory storage area 19. A communication path for exchanging data between the computer system 9 and the secure server 17 includes the elements 16, 21 and 20. Optionally, the ports 16 and 20 are secure input/output ports.

Figure 2:
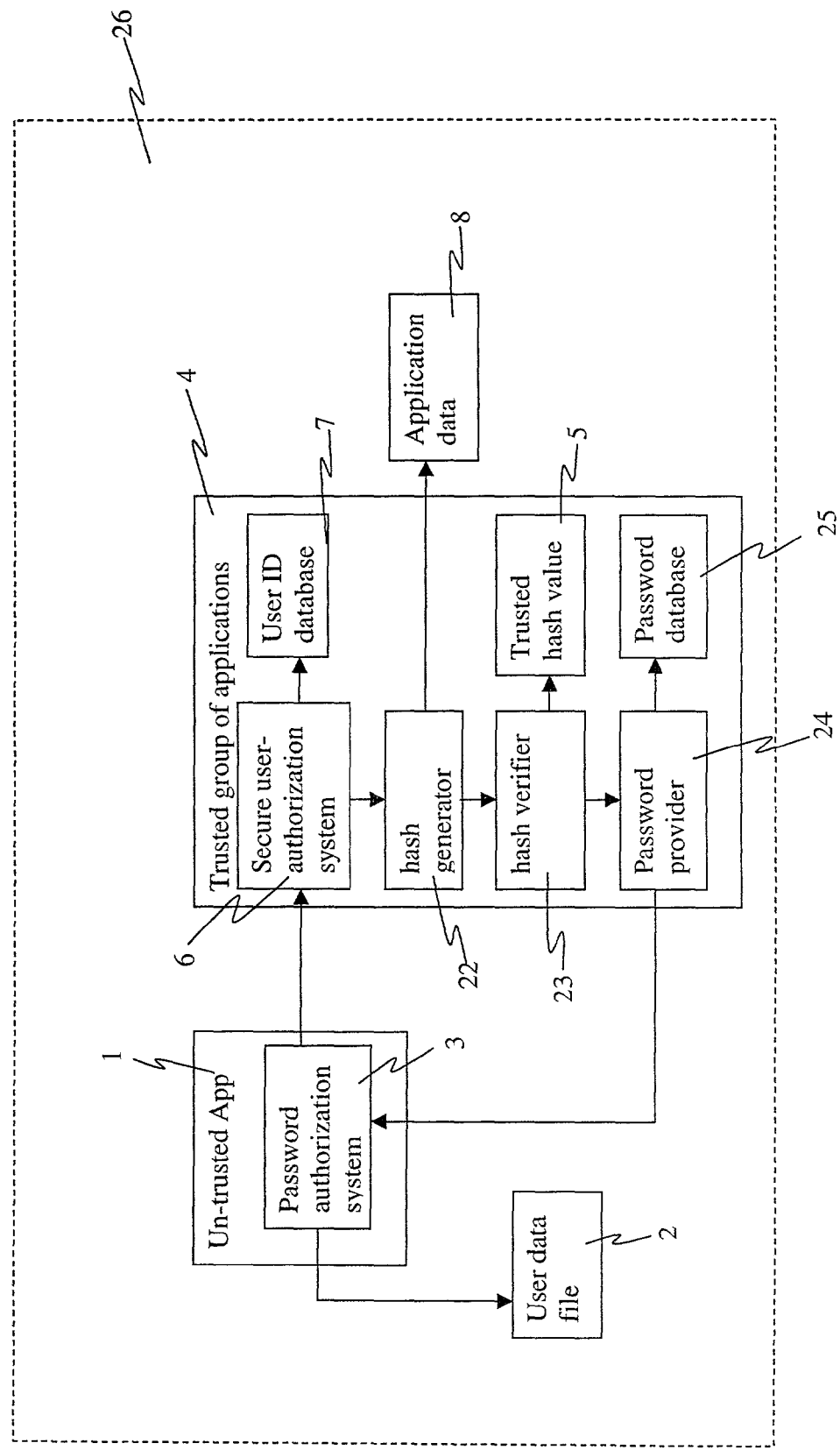

Referring now to FIG. 2, shown is a code block diagram according to a first embodiment of the instant invention. FIG. 2 depicts a group of applications 26 for execution on processor 12 of the prior art system 11 of FIG. 1a. Group 26 includes a "trusted group" of applications 4 and at least an un-trusted end application 1, such as for example a word processor application. The un-trusted application 1 includes code for performing user authorization using, for example, a standard password authorization system 3. In use, a user of system 11 initiates an action requiring a password, such as for instance attempting to access a user data file 2 associated with the un-trusted application 1. The un-trusted application 1 prompts for a password, which is detected by the trusted group of applications 4. The trusted group of applications 4 includes a secure user-authorization system 6, which prompts the user to provide user authorization information via the input device 14. The secure user-authorization system 6 compares the provided sample with a template retrieved from a user verification database 7 and verifies the identity of the user in dependence upon the comparison. Once the identity of the user is verified, a hash generator 22 accesses data 8 stored in one of the memory storage device 13 and the memory circuit 34 of computer system 11. Using a predetermined hashing algorithm, hash generator 22 determines a unique hash signature for the current state of the applications running within the computer system 11. For example, the hash generator 22 comprises executable code for examining data of the operating system memory such as the DLL tables or the system call stack, and for generating a hash value representative of the examined data. A hash verifier 23 compares the generated system hash value to a trusted hash value 5, the trusted hash value 5 having been generated previously and retrievably stored when the computer system 11 was in a verified secure state. The trusted hash value is encoded to ensure that it is not tampered with. For example, the trusted hash value is digitally signed by a trusted entity such as the secure-user authorization system 6. Hash verifier 23 includes code for decrypting the encrypted hash value and for verifying a digital signature of same. When the comparison performed by hash verifier 23 indicates that the generated hash value is identical to the trusted hash value 5 and the trusted hash value is not tampered with, a password provider 24 of the trusted group of applications 4 accesses a password database 25 in order to retrieve the requested password. The password provider 24 provides the retrieved password to the password authorization system 3 of un-trusted application 1, thereby allowing the user to access and decrypt the user data file 2.

Figure 3:
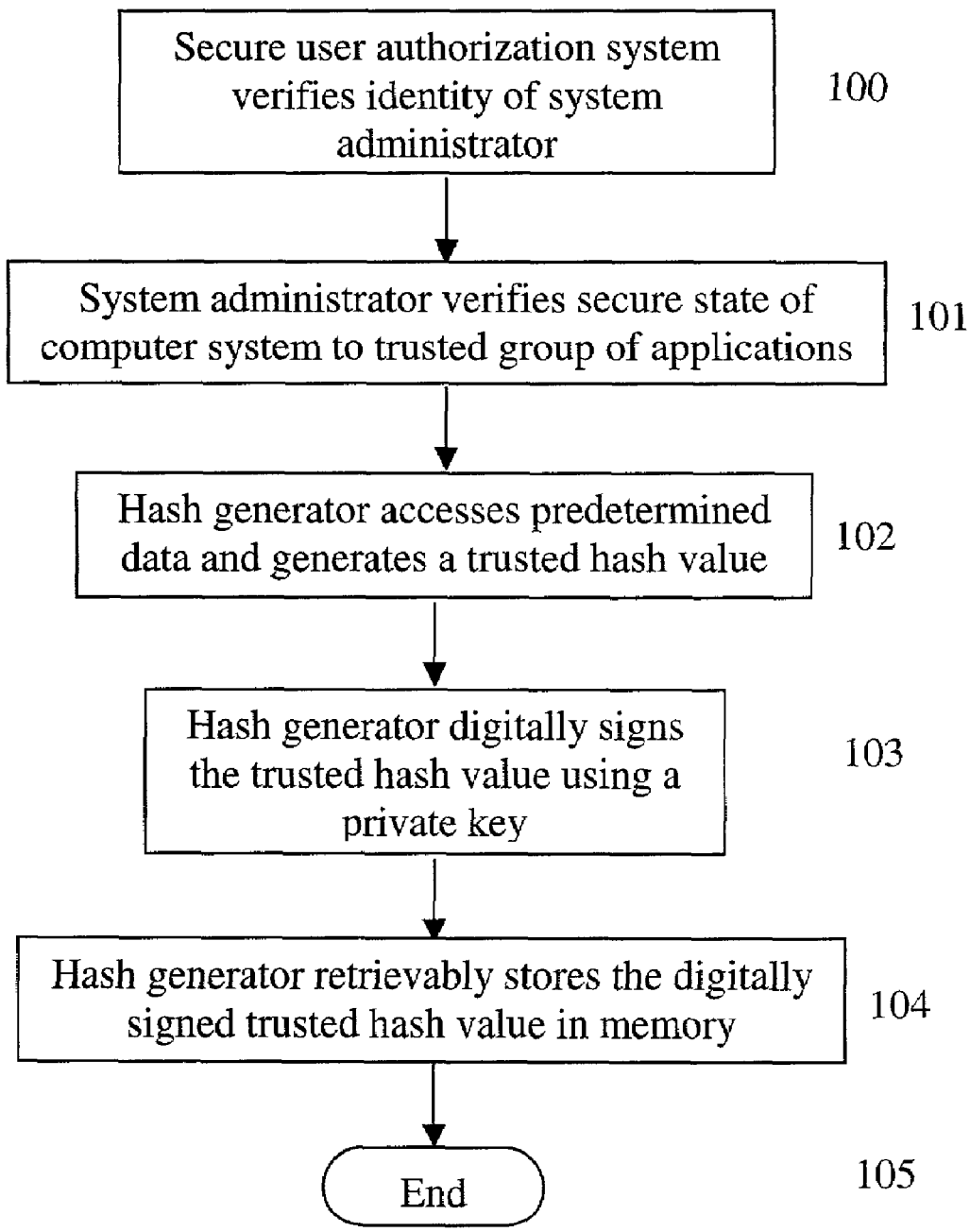
FIG. 3 shows a simplified flow diagram of a method for generating a trusted hash value according to the first embodiment of the instant invention.

Referring now to FIG. 3, shown is a simplified flow diagram of a method according to the present invention for obtaining a trusted system hash value when the computer system 11 is in a known or initial state, in particular a secure state. At step 100 the secure user-authorization system 6 verifies the identity of a system administrator, the system administrator being authorized to establish a trusted hash value of the computer system 11. At step 101 the system administrator provides a command to the trusted group of applications 4 indicative of a secure state of the computer system 11. The hash generator 22 examines at step 102 data 8 stored in one of the memory storage device 13 and the memory circuit 34 of computer system 11. Using a predetermined hashing algorithm, hash generator 22 determines a trusted hash value for the current trusted state of the applications running within the computer system 11. For example, the hash generator 22 comprises executable code for examining data of the operating system memory such as the DLL tables or the system call stack, and for generating a hash value representative of the examined data. Of course, other operating state independent hash values are also determinable. At step 103 the hash generator 22 digitally signs through a step of encryption the trusted hash value thus obtained, for instance using a private key that is other than available outside of by the system administrator using the trusted group of applications 4. The digitally signed trusted hash value is retrievably stored by the hash generator 22 at step 104, and the method of FIG. 3 terminates at step 105.

Advantageously, the authenticity of the digitally signed trusted hash value is verifiable by hash verifier 23 when it is decrypted. Further advantageously, the trusted hash value is stored in an encrypted form that can only be reproduced by the hash generator of the trusted system using a private key that is other than accessible outside of the trusted group of applications 4. As such, it is very difficult for a hacker to fake the digitally signed and encrypted trusted hash value.

Of course, though a detailed method of generating the hash value is described, once generated for a known installed system, a same hash value is usable by identically configured systems. For example, a company installing identical computer systems on a plurality of desktops could generate a system image for installation on each computer. Since the system image is trusted and identical for different computers, the trusted hash value will also be identical. Thus, it is possible to generate the trusted hash value in a secure environment having physical security as well and then to merely install it on user systems. This obviates a need for additional private key security for the private key used to digitally sign the hash value.

Figure 4:
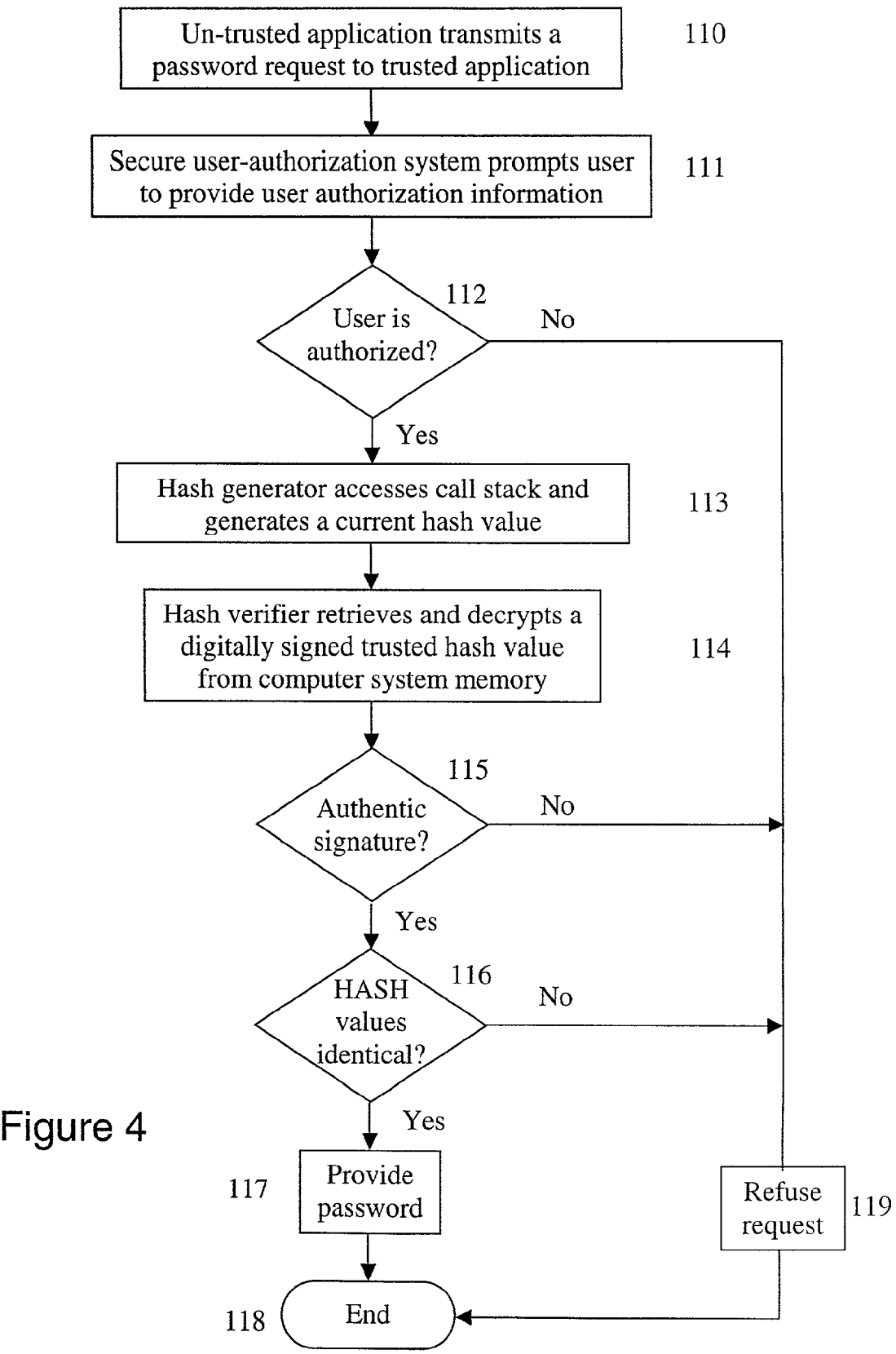
FIG. 4 shows a simplified flow diagram of a method for detecting a malicious computer application according to the first embodiment of the instant invention

Referring now to FIG. 4, shown is a flow diagram of a method according to the first preferred embodiment of the instant invention. The method is initiated at step 110 when the un-trusted application 1 transmits to the trusted group of applications 4 a request for a password, for instance the request is transmitted in response to an attempt by the user to access an encrypted user data file 2. Often such a request is transmitted by a trap process in execution on the system for detecting password request operations. As is evident to those of skill in the art, it is difficult to ensure that each version of each application in execution on a system is secure. Further, it is difficult to ensure that a password provided to an application is for the "anticipated" use.

At step 111 the secure user-authorization system 6 prompts the user to provide user authorization information, for instance a biometric information sample provided via input device 14. At decision step 112 the secure user-authorization system 6 compares the provided information with template information retrieved from the user verification database 7 and determines if there is a match within predetermined limits. For example, the user authorization information is a fingerprint image and fingerprint recognition processes are employed to identify and/or authorize the user. When the comparison indicates other than a match, the trusted group of applications 4 refuses at step 119 the password request and the method of FIG. 4 terminates at step 118. Optionally, the trusted group of applications 4 transmits a message indicative of an unauthorized access attempt to a system administrator of the computer system. Further optionally, the password provider 24 transmits a blank and thus incorrect password to the password authorization system 3 of the un-trusted application 1, thereby denying the user access to said data file 2.

When the comparison at decision step 112 indicates a match, the hash generator 22 accesses data 8 stored in at least one of the non-volatile memory 13 and the volatile memory 34 of computer system 11. Using a predetermined hashing algorithm, hash generator 22 at step 113 determines a unique hash signature for the current state of the applications running within the computer system 11. For example, the hash generator 22 comprises executable code for examining data of the operating system memory such as the DLL tables or the system call stack, and for generating a hash value representative of the examined data. At step 114 the hash verifier 23 retrieves the digitally signed trusted hash value for the computer system from memory and decrypts the trusted hash value using an associated public key. If at decision step 115 the digital signature is determined to be authentic, the hash verifier 23 at decision step 116 compares the hash value generated at step 113 with the trusted hash value retrieved at step 114. If the two hash values match within predetermined limits, the password provider 24 accesses the password database 25, retrieves the requested password and at step 117 transmits the retrieved password to the password authorization system 3 of un-trusted application 1. Typically, the hash values must match. The method of FIG. 4 terminates at step 118.

Of course, if at decision step 115 the digital signature is determined to be other than authentic, or if at decision step 116 the two hash values are determined to be other than identical, the trusted group of applications 4 refuses the password request at step 119 and the method of FIG. 4 terminates at step 118. Optionally, the password provider 24 transmits a blank and thus incorrect password to the password authorization method 3 of the un-trusted application 1, thereby denying the user access to said data file 2. Further optionally, the trusted group of applications 4 locks-out future access from all un-trusted applications in execution on processor 12 when at step 116 it is determined that the two hash values are other than identical. Locking-out access prevents the trusted applications from providing passwords to maintain the passwords in a secure environment. The purpose of preventing the provision of password data in a situation wherein the system state has been previously compromised is to prevent a virus or a Trojan horse application from intercepting and recording the password data that is passed between the secure group of applications 4 and the unsecure application. Furthermore, since the system has been compromised already, it is redundant to continue re-running the secure user-authorization system 6 until the system has been restored to a known secure state.

Figure 5A:
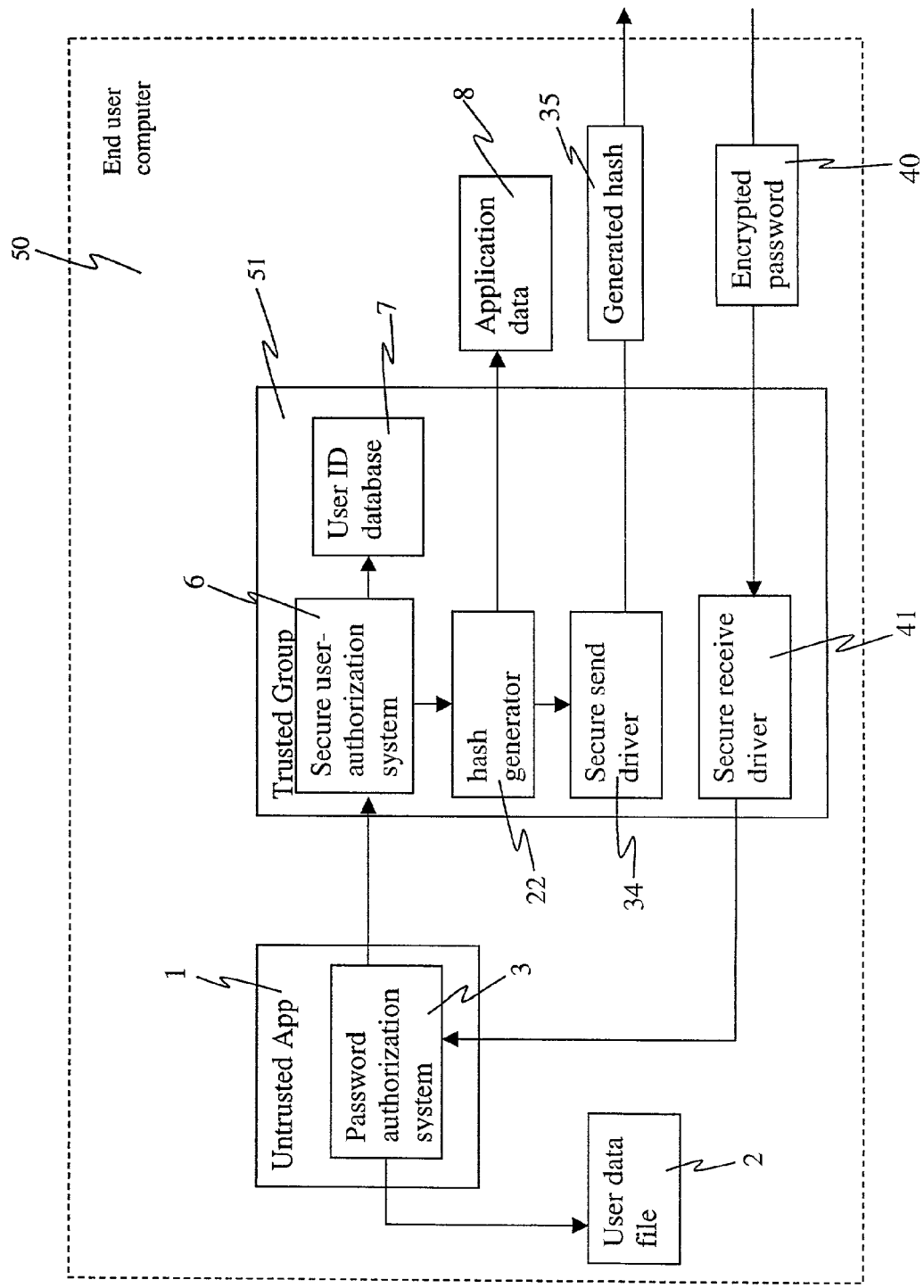
FIG. 5a shows a simplified code block diagram according to a second embodiment of the instant invention for execution on the end-user computer system shown in FIG. 1b.
Figure 5B:
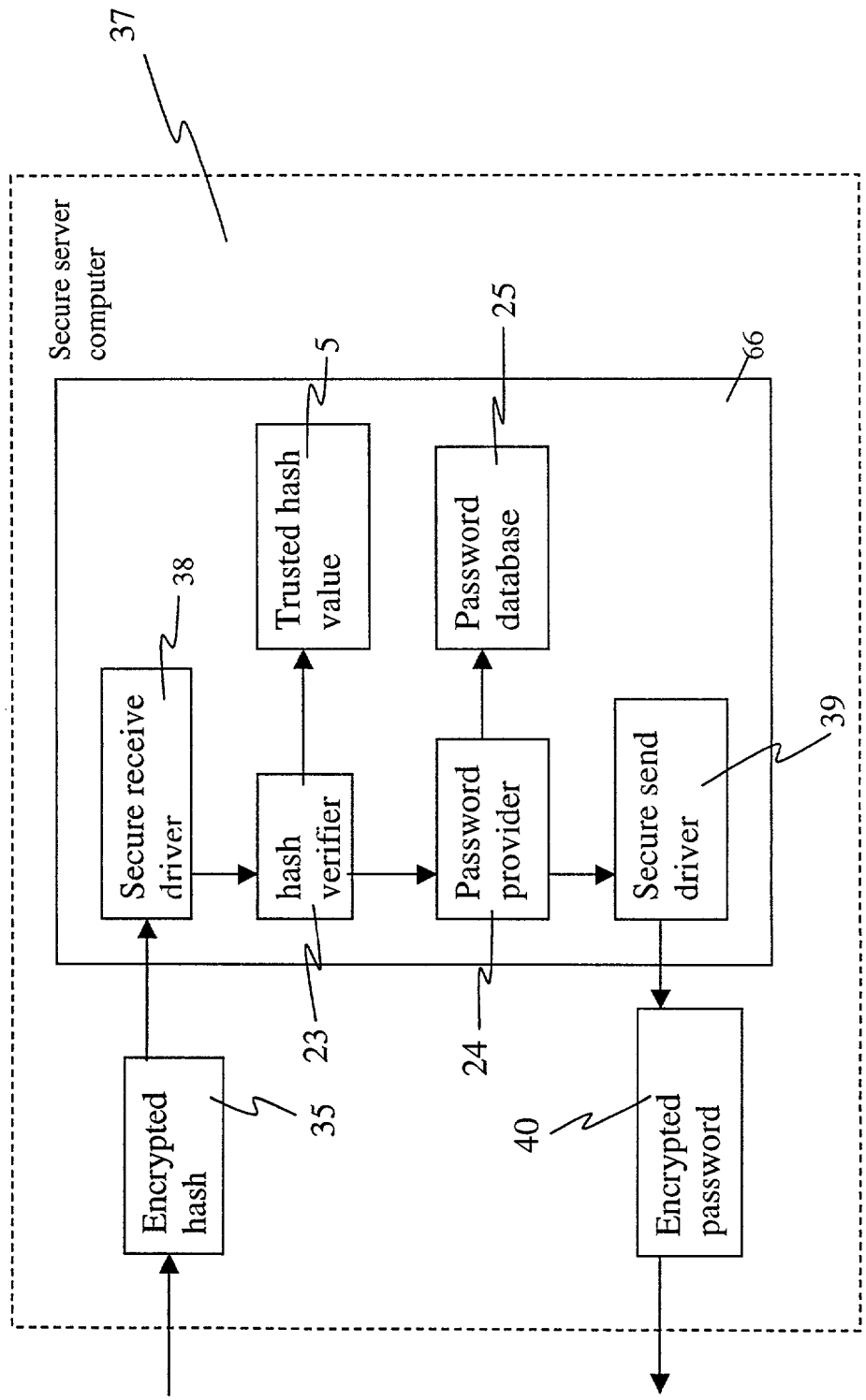
FIG. 5b shows a simplified code block diagram according to the second embodiment of the instant invention for execution on the secure server shown in FIG. 1b.

Referring now to FIGS. 5a and 5b, shown are code block diagrams according to a second embodiment of the instant invention. This embodiment is similar to the first embodiment discussed supra, however, it differs in that the trusted group of applications is distributed across multiple platforms, for instance the end-user computer system 9 and the secure server 17 of the networked system 10 shown in FIG. 1b. FIG. 5a depicts a group of applications 50 for execution on processor 12 of the computer system 9. Group 50 includes a "trusted group" of applications 51 and at least an un-trusted end application 1, such as for instance a word processor application. The un-trusted application 1 includes code for performing user authorization using, for example, a standard password authorization system 3. In use, a user of the networked system 10 initiates an action requiring a password, such as for instance attempting to access a user data file 2 associated with the un-trusted application 1. The un-trusted application 1 transmits a request for a password to the trusted group of applications 51. The trusted group of applications 51 includes a secure user-authorization system 6, which prompts the user to provide user authorization information via the input device 14. The secure user-authorization system 6 compares the provided sample with a template retrieved from a user ID verification database 7 and verifies the identity of the user in dependence upon the comparison. Once the identity of the user is verified, a hash generator 22 accesses application data 8 stored in one of the memory storage device 13 and the memory circuit 34 of computer system 9. Using a predetermined hashing algorithm, hash generator 22 determines a unique hash signature for the current state of the applications running within the computer system 9. For example, the hash generator 22 comprises executable code for examining data of the operating system memory such as the DLL tables or the system call stack, and for generating a hash value 35 representative of the examined data. The system transmits the generated hash 35 value using a secure send driver 34 of port 16, which includes a predetermined secure transmission protocol. For example, the transmission is made over a known secure transmission route, via a tunnel, or using known session encryption techniques. This allows the generated hash value 35 to be transmitted over a network 21 to be received by a secure server 17 via port 20.

FIG. 5b depicts a group of applications 37 for execution on processor 18 of the secure server 17. Group 37 includes a "trusted group" of applications 66. In use, the secure server 17 uses a secure receive driver 38 of port 20 to receive the hash value 35 transmitted from the trusted group of applications 4 of computer system 9. The hash value 35 is passed to the hash verifier 23. The hash verifier 23 retrieves a trusted hash value 5 for computer system 9 that is stored locally on secure server 17. For instance, the trusted hash value is generated when computer system 9 is in a known secure state according to the method of FIG. 3 and transmitted via network 21 for storage in memory storage area 19 of secure server 17. The trusted hash value is typically stored in an encoded form to ensure that it is not tampered with. For example, the trusted hash value is digitally signed by a trusted entity such as the secure-user authorization system 6 of computer system 9. The hash verifier 23 verifies the digital signature of the trusted hash value 5 and compares the transmitted hash value 35 to the trusted hash value 5. When the comparison indicates that the generated hash value 35 is identical to the trusted hash value 5, thus confirming the secure state of the remote computer system 9, a password provider 24 of the trusted group of applications 66 of the secure server 17 accesses a password database 25 in order to retrieve the requested password. The password provider 24 provides the retrieved password 40 in encrypted form to the un-trusted application 1 of computer system 9 using a secure send driver 39 of port 20. A secure receive driver 41 of port 16 receives the encrypted password 40 and provides same to password authorization system 3 of the un-trusted application 1, thereby allowing the user of computer system 9 to access the user data file 2.

Figure 6:
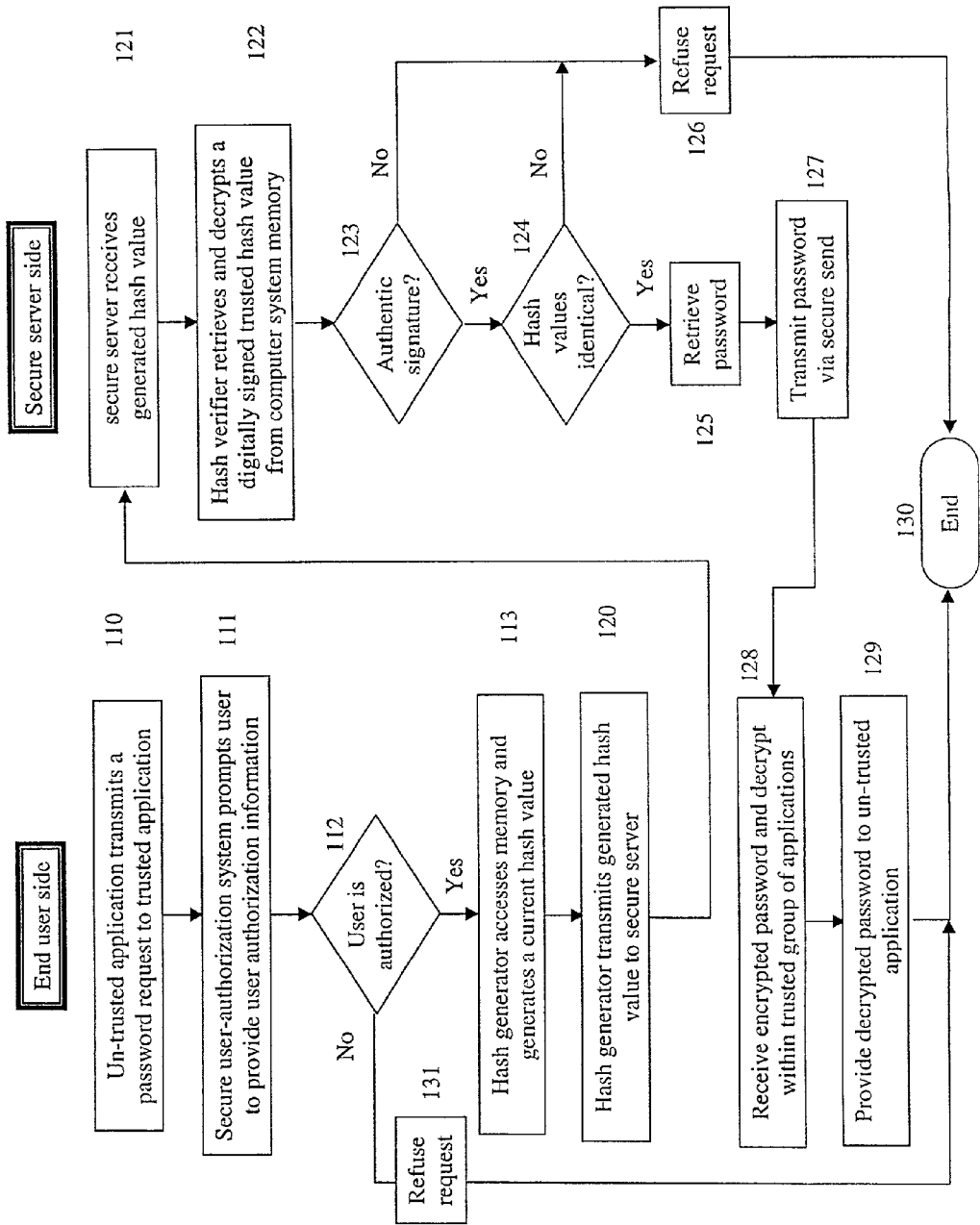
FIG. 6 shows a simplified flow diagram of a method for detecting a malicious computer application according to the second embodiment of the instant invention.

Referring now to FIG. 6, shown is a flow diagram of a method according to the second embodiment of the instant invention. The method is initiated at step 110 when the un-trusted application 1 transmits to the trusted group of applications 51 a request for a password, for instance the request is transmitted in response to an attempt by the user to access an encrypted user data file 2. Often such a request is transmitted by a trap process in execution on the system for detecting password request operations. At step 111 the secure user-authorization system 6 prompts the user to provide user authorization information, for instance a biometric information sample provided via input device 14. At decision step 112 the secure user-authorization system 6 compares the user-provided information with template information retrieved from the user verification database 7 and determines if there is a match within predetermined limits. For example, the user authorization information is a fingerprint image and fingerprint recognition processes are employed to identify and/or authorize the user. When the comparison indicates other than a match, the trusted group of applications 51 refuses at step 131 the password request and the method of FIG. 6 terminates at step 130. Optionally, the trusted group of applications 51 transmits a message indicative of an unauthorized access attempt to an administrator of the computer system.

When the comparison at decision step 112 indicates a match, the hash generator 22 accesses application data 8 stored in one of the memory storage device 13 and the memory circuit 34 of computer system 9. Using a predetermined hashing algorithm, hash generator 22 determines a unique hash signature for the current state of the applications running within the computer system 9. For example, the hash generator 22 comprises executable code for examining data of the operating system memory such as the DLL tables or the system call stack, and for generating a hash value 35 representative of the examined data. At step 120 the generated hash value is transmitted to the secure server 17 via the network 21, for instance using a secure send driver 34 of the input/output port 16 which prepares a request and which optionally encrypts the generated hash value prior to transmission.

The secure server 17 receives at step 121 the transmitted hash and request via a secure receiving driver 38 of input/output port 20. Of course, when the hash value is encrypted prior to transmission, step 121 includes the optional step of decrypting the transmitted data. At step 122 the hash verifier 23 retrieves the digitally signed trusted hash value 5 from memory 19 and decrypts the trusted hash value using an associated public key. If at decision step 123 the digital signature is determined to be authentic, then the hash verifier 23 compares the generated hash value to the trusted hash value at decision step 124. If the comparison indicates that the two hash values are identical, the password provider 24 accesses the password database 25 and retrieves at step 125 the password. The step of retrieving the password includes the step of encrypting the password using a predetermined private key to provide an encrypted password 40. Optionally, the step of retrieving the password includes the step of retrieving an encrypted password 40 from the password database 25. At step 127 the encrypted password 40 is transmitted using a secure send driver 39 of input/output port 20. At step 128 the encrypted password 40 is received using a secure receive driver of input/output port 16 of computer system 9 and is decrypted within the secure group of applications 51. The requested password is provided in decrypted form to the password authorization system 3 of the un-trusted application 1 at step 129. The method of FIG. 6 terminates at step 130.

Of course, if at decision step 123 the digital signature is determined to be other than authentic, or if at decision step 124 the two hash values are determined to be other than identical, the trusted group of applications 66 refuses at step 126 the password request and the method of FIG. 6 terminates at step 130. Optionally, the password provider 24 transmits a blank and thus incorrect password to the password authorization method 3 of the un-trusted application 1, thereby denying the user access to said data file 2. Further optionally, the trusted group of applications 66 sends a lock command to the end user trusted group of applications 51 to lock-out future access from any un-trusted application when the decision at step 124 is that the hash values do not match. Locking-out access to the trusted group of applications 51 prevents the user from providing user authorization information via input device 14. The purpose of preventing the input of user authorization information in a situation wherein the system state has been previously compromised is to prevent a virus or a Trojan horse application from intercepting and recording or otherwise modifying the data passed between the input device 14 and the secure group of applications 51. Furthermore, since the system has been compromised already, it is redundant to continue re-running the secure user-authorization system 6 until the system has been restored to a known secure state.

Optionally, when the computed hash value and the trusted hash value are other than a same hash value, the methods of FIGS. 4 and 6 initiate a routine wherein the authorized user of the computer system is prompted to verify that a detected unauthorized executable program is an unauthorized program installed from a secure source. Of course, the user must possess an acceptable security clearance as indicated in the ID verification database 7 to be allowed to override the security application of the instant invention. When the detected unauthorized executable program is verifiably secure, the security application provides the requested encryption data from the trusted source. Further optionally, a new trusted hash value reflecting the unauthorized changes to the system is prepared, for instance according to the method of FIG. 3.

Of course, numerous other embodiments may be envisaged without departing significantly from the spirit or scope of the invention.

What is claimed is:

1. A method of detecting unauthorized executable code resident in a computer system, the method comprising:
    receiving user authorization information;
    authenticating the user authorization information to perform at least one of authorize and identify a user;
    when the user is at least one of authorized or identified, requesting security data of the user;
    hashing first data stored in data storage within the computer system using a selected hashing process to determine a computed hash value, wherein the first data includes data representing a current state of at least one application executing within the computer system;
    retrieving a trusted hash value, wherein the trusted hash value was created using the selected hashing process applied to second data representing a secure state of the one or more applications executing in the computer system, wherein the second data includes a system memory location indicative of the at least one application executing within the computer system; and
    comparing the computed hash value with the trusted hash value to determine whether there is unauthorized executable code in the computer system.

2. The method of claim 1, wherein the authorization data is at least a biometric information sample, and wherein the authenticating includes comparing the at least a biometric information sample to a previously stored biometric template.

3. The method of claim 1, further comprising:
    when the comparison is indicative of other than unauthorized executable code resident in a computer system, providing the requested security data relating to the user.

4. The method of claim 1, further comprising:
    receiving a request for security data from an application in execution in the computer system; and
    when the comparison is indicative of other than an unauthorized executable program resident in a computer system, providing security data to the application.

5. The method of claim 1, wherein the trusted hash value and the computed hash value are determined by a same trusted security application executing locally on a processor of a same computer system at different times, the trusted hash value determined when the known state is a secure state.

6. The method of claim 5, wherein the trusted hash value is digitally signed.

7. The method of claim 6, further comprising verifying an authenticity of the digitally signed trusted hash value.

8. The method of claim 7, further comprising:
    receiving a request for security data from an application in execution in the computer system; and
    when the authenticity of the digitally signed trusted hash value is verified and the comparison is indicative of other than unauthorized executable code resident in a computer system, providing the requested security data to the application.

9. The method of claim 8, wherein the application and the predetermined hashing process are both executed on a same processor of the computer system.

10. The method of claim 7, further comprising:
when the computed hash value and the trusted hash value are other than indicative of a secure state, issuing a notification that unauthorized executable code is detected within the computer system.

11. The method of claim 10, further comprising:
when the computed hash value and the trusted hash value are other than indicative of a secure state, preventing access to the computer system.

12. The method of claim 6, further comprising:
transmitting the trusted hash value to a second other computer system in communication with the computer system and retrievably storing the computed hash value within the second other computer system.

13. The method of claim 12, further comprising transmitting the computed hash value to the second other computer system for comparison with the trusted hash value by a processor of the second other computer system.

14. The method of claim 12, wherein the computed hash value is determined in dependence upon the predetermined data existing in memory within the computer system and some time dependent data of the computer system.

15. The method of claim 13, wherein the second other computer system includes a trusted source and wherein security data is stored for provision to applications in execution on systems that are known to be secure.

16. The method of claim 1, wherein the second data includes DLL tables.

17. The method of claim 1, wherein the predetermined data is hashed in an absolute memory location independent fashion.

18. The method of claim 1, wherein if the computed hash value and the trusted hash value substantially match, there is no unauthorized executable code in the computer system.

19. The method of claim 1, further comprising performing a user authorization process for verifying that a user is authorized.

20. The method of claim 19, wherein the one or more applications executing in the computer system includes at least one untrusted application and at least one trusted application, and further comprising transmitting a password request from the at least one untrusted application to the at least one trusted application.

21. The method of claim 20, wherein the transmitting a password request from the at least one untrusted application to the at least one trusted application is in response to a user's attempt to access a data file associated with the at least one untrusted application.

22. The method of claim 20, wherein the user authorization process comprises:
detecting the password request from the at least one untrusted application by the at least one trusted application;
prompting the user to input authorization information; and
comparing the input authorization information with information retrieved from the at least one trusted application, wherein if the input authorization information successfully compares with the information retrieved from the at least one trusted application, the user is an authorized user.

23. The method of claim 22, wherein the hashing data, retrieving a trusted hash value and the comparing the computed hash value with the trusted hash value are carried out if the input authorization information successfully compares with the information retrieved from the at least one trusted application.

24. The method of claim 22, wherein the input authorization information comprises at least biometric information, and wherein the comparing includes comparing the at least biometric information with a previously stored biometric template.

25. The method of claim 22, wherein the at least one trusted application includes a user verification database, and wherein the input authorization information is compared with information retrieved from the user verification database.

26. The method of claim 20, wherein the trusted hash value is digitally signed and further comprising:
decrypting the digitally-signed trusted hash value;
comparing the decrypted trusted hash value with the computed hash value; and
refusing the password request from the at least one untrusted application if the computed hash value and the decrypted trusted hash value do not substantially match.

27. The method of claim 1, wherein the at least one trusted application includes a hash generator and wherein the hashing data is carried out in the hash generator.

28. The method of claim 1, wherein the trusted hash value is encrypted.

29. The method of claim 28, wherein the trusted hash value is digitally signed.

30. The method of claim 29, further comprising:
decrypting the digitally-signed trusted hash value; and
comparing the decrypted trusted hash value with the computed hash value wherein if the computed hash value and the decrypted trusted hash value substantially match, there is no unauthorized executable code in the computer system.

31. The method of claim 28, further comprising:
decrypting the encrypted trusted hash value; and
comparing the decrypted trusted hash value with the computed hash value, wherein if the computed hash value and the decrypted trusted hash value substantially match, there is no unauthorized executable code in the computer system.

32. The method of claim 28, wherein the computer system includes a plurality of networked computers, and wherein the encrypted trusted hash value is stored in a secure one of said plurality of computers, the method further comprising:
receiving in the secure computer, the computed hash value transmitted from at least a first computer;
decrypting the encrypted trusted hash value in the secure computer;
wherein the comparing of the decrypted trusted hash value with the computed hash value occurs in the secure computer; and
if the computed hash value and the trusted hash value substantially match—
retrieving a password from a memory in the secure computer; and
transmitting the retrieved password to the at least a first computer.

33. The method of claim 32, wherein the one or more applications executing in the computer system includes at least one untrusted application executing on the at least a first computer and at least one trusted application executing on the at least a first computer, the method further comprising:
detecting a password request from the at least one untrusted application by the at least one trusted application;
prompting the user to input authorization information;
comparing the input authorization information with information retrieved from the at least one trusted application; and wherein if the input authorization information successfully compares with the information retrieved from the at least one trusted application, the user is an authorized user.

34. The method of claim 32, wherein the trusted hash value is digitally signed, and further comprising:
decrypting the digitally-signed trusted hash value in the secure computer; and
comparing the decrypted trusted hash value with the computed hash value in the secure computer, wherein if the computed hash value and the decrypted trusted hash value substantially match, there is no unauthorized executable code in the at least a first computer.

35. The method of claim 34, further comprising:
refusing the password request from the at least one untrusted application if the computed hash value and the decrypted trusted hash value do not substantially match.

36. The method of claim 32, further comprising:
determining that the at least a first computer is in a known state;
hashing data representing the known state of the at least one application executing in the at least a first computer using the selected hashing process to create the trusted hash value; and
encrypting the trusted hash value.

37. The method of claim 36, further comprising:
transmitting the encrypted trusted hash value to the secure computer; and
storing the encrypted trusted hash value in the secure computer.

38. The method of claim 32, further comprising:
encrypting the computed hash value in the at least a first computer prior to transmission; and
decrypting the computer hash value in the secure computer.

39. The method of claim 32, wherein the retrieved password is encrypted, and further comprising:
decrypting the retrieved password in the at least a first computer.

40. The method of claim 32, further comprising:
transmitting an incorrect password to the at least one untrusted application of the at least first computer if the computed hash value and the trusted hash value do not substantially match.

41. The method of claim 32, further comprising:
transmitting a lock command to the at least one untrusted application of the at least first computer if the computed hash value and the trusted hash value do not substantially match.

42. The method of claim 32, wherein if the computed hash value and the trusted hash value do not substantially match, there is unauthorized executable code in the at least a first computer, and further comprising:
prompting a user to verify that the unauthorized executable code is from a known source.

43. The method of claim 32, wherein the known state is an initial state of an operating system within the computer system.

44. The method of claim 1, wherein the data storage comprises at least a volatile memory.

45. The method of claim 1, wherein the data storage comprises at least a disk drive.

46. The method of claim 1, further comprising:
determining that the computer system is in a known state;
hashing data representing the known state of the at least the one application executing in the computer system using the selected hashing process to create the trusted hash value; and
encrypting the trusted hash value.

47. The method of claim 46, further comprising:
retrievably storing the trusted hash value in the data storage.

48. The method of claim 46, wherein the determining comprises:
performing a user authorization process to determine an authorized user; and
receiving a command from the authorized user that the computer system is in a known state.

49. The method of claim 46, wherein the trusted hash value is digitally signed.

50. The method of claim 1, further comprising:
prompting a user to verify that the unauthorized executable code is from a known source if the computed hash value and the trusted hash value do not substantially match.

51. The method of claim 1, wherein the known state is an initial state of an operating system within the computer system.

52. A method of detecting unauthorized executable code resident in a computer system, the method comprising:
receiving user authorization information;
authenticating the user authorization information to perform at least one of authorize and identify a user;
when the user is at least one of authorized or identified, requesting security data of the user;
providing a trusted security application executable on a processor of the computer system for determining a hash value using a selected hashing process applied to predetermined data existing in memory within the computer system, wherein the predetermined data includes system memory locations indicative of executable programs in operation;
hashing the selected data existing in memory within the computer system using the predetermined process to determine a hash value;
digitally signing the hash value to provide a trusted hash value; and
retrievably storing the trusted hash value, wherein the predetermined data relates to programs in execution on the processor of the computer system when the computer system is in a secure state.

53. The method of claim 52, further comprising:
comparing a computed hash value with the trusted hash value to detect changes to the predetermined data existing in memory within the computer system.

54. The method of claim 53, further comprising verifying the authenticity of the digital signature of the trusted hash value.

55. The method of claim 54, further comprising:
when the computed hash value and the trusted hash value are indicative of a same state of a computer system, providing security data from a trusted source to an application in execution on the system.

56. The method of claim 55, further comprising:
when the computed hash value and the trusted hash value are other than indicative of a same state of the system, sending a notification.

57. A system for detecting unauthorized executable resident in a computer system, the system comprising a computer processor programmed to perform the method comprising:
receiving user authorization information;
authenticating the user authorization information to perform at least one of authorize and identify a user;
when the user is at least one of authorized or identified, requesting security data of the user;
hashing first data stored in data storage within the computer system using a selected hashing process to determine a computed hash value, wherein the first data includes data representing a current state of at least one application executing within the computer system;

retrieving a trusted hash value, wherein the trusted hash value was created using the selected hashing process applied to second data representing a secured state of the one or more applications executing in the computer system, wherein the second data includes data from at least a system memory location indicative of the at least one application executing within the computer system; and comparing the computed hash value with the trusted hash value to determine whether there is unauthorized executable code in the computer system.

58. A computer readable storage medium for detecting unauthorized executable code resident in a computer system, the computer readable storage medium having stored thereon instructions that, when executed, perform a method comprising:

receiving user authorization information;

authenticating the user authorization information to perform at least one of authorize and identify a user;

when the user is at least one of authorized or identified, requesting security data of the user;

hashing first data stored in data storage within the computer system using a selected hashing process to determine a computed hash value, wherein the first data includes data representing a current state of at least one application executing within the computer system;

retrieving a trusted hash value, wherein the trusted hash value was created using the selected hashing process applied to second data representing a secure state of the one or more applications executing in the computer system, wherein the second data includes a system memory location indicative of the at least one application executing within the computer system; and comparing the computed hash value with the trusted hash value to determine whether there is unauthorized executable code in the computer system.

59. The computer readable storage medium of claim 58, wherein the authorization data is at least a biometric information sample, and wherein the authenticating includes comparing the at least a biometric information sample to a previously stored biometric template.

60. The computer readable storage medium of claim 58, further comprising computer executable instructions for, when the comparison is indicative of other than unauthorized executable code resident in a computer system, providing the requested security data relating to the user.

61. The computer readable storage medium of claim 58, further comprising computer executable instructions for receiving a request for security data from an application in execution in the computer system, and when the comparison is indicative of other than an unauthorized executable program resident in a computer system, providing security data to the application.

62. The computer readable storage medium of claim 58, wherein the trusted hash value and the computed hash value are determined by a same trusted security application executing locally on a processor of a same computer system at different times, the trusted hash value determined when the known state is a secure state.

63. The computer readable storage medium of claim 62, wherein the trusted hash value is digitally signed.

64. The computer readable storage medium of claim 63, wherein the hashing data includes verifying an authenticity of the digitally signed trusted hash value.

65. The computer readable storage medium of claim 64, further comprising computer executable instructions for when the computed hash value and the trusted hash value are other than indicative of a secure state, issuing a notification that unauthorized executable code is detected within the computer system.

66. The computer readable storage medium of claim 65, further comprising computer executable instructions for, when the computed hash value and the trusted hash value are other than indicative of a secure state, preventing access to the computer system.

67. The computer readable storage medium of claim 63, further comprising computer executable instructions for transmitting the trusted hash value to a second other computer system in communication with the computer system and retrievably storing the computed hash value within the second other computer system.

68. The computer readable storage medium of claim 67, further comprising transmitting the computed hash value to the second other computer system for comparison with the trusted hash value by a processor of the second other computer system.

69. The computer readable storage medium of claim 68, wherein the computed hash value is determined in dependence upon the predetermined data existing in memory within the computer system and some time dependent data of the computer system.

70. The computer readable storage medium of claim 69, wherein the second other computer system includes a trusted source and wherein security data is stored for provision to applications in execution on systems that are known to be secure.

71. The computer readable storage medium of claim 58, further comprising computer executable instructions for receiving a request for security data from an application in execution in the computer system, and, when the authenticity of the digitally signed trusted hash value is verified and the comparison is indicative of other than unauthorized executable code resident in a computer system, providing the requested security data to the application.

72. The computer readable storage medium of claim 71, wherein the application and the predetermined hashing process are both executed on a same processor of the computer system.

73. A system for detecting unauthorized executable resident in a computer system, the system comprising:

means for receiving user authorization information;

means for authenticating the user authorization information to perform at least one of authorize and identify a user;

means for requesting security data of the user when the user is at least one of authorized or identified;

means for hashing first data stored in data storage within the computer system using a selected hashing process to determine a computed hash value, wherein the first data includes data representing a current state of at least one application executing within the computer system;

means for retrieving a trusted hash value, wherein the trusted hash value was created using the selected hashing process applied to second data representing a secure state of the one or more applications executing in the computer system, wherein the second data includes data from at least a system memory location indicative of the at least one application executing within the computer system; and means for comparing the computed hash value with the trusted hash value to determine whether there is unauthorized executable code in the computer system.

74. A method of detecting unauthorized executable code resident in a computer system, the method comprising:
hashing first data stored in data storage within the computer system using a selected hashing process to determine a computed hash value, wherein the first data includes data representing a current state of at least one application executing within the computer system;
retrieving a trusted hash value, wherein the trusted hash value was created using the selected hashing process applied to second data representing a secure state of the one or more applications executing in the computer system, wherein the second data includes a system memory location indicative of the at least one application executing within the computer system;
comparing the computed hash value with the trusted hash value to determine whether there is unauthorized executable code in the computer system; and
performing a user authorization process for verifying that a user is authorized,
wherein the one or more applications executing in the computer system includes at least one untrusted application and at least one trusted application, and wherein the method further comprises transmitting a password request from the at least one untrusted application to the at least one trusted application, and
wherein the trusted hash value is digitally signed, and the method further comprises—
decrypting the digitally-signed trusted hash value;
comparing the decrypted trusted hash value with the computed hash value; and
refusing the password request from the at least one untrusted application if the computed hash value and the decrypted trusted hash value do not substantially match.

75. A method of detecting unauthorized executable code resident in a computer system, the method comprising:
hashing first data stored in data storage within the computer system using a selected hashing process to determine a computed hash value, wherein the first data includes data representing a current state of at least one application executing within the computer system;
retrieving a trusted hash value, wherein the trusted hash value was created using the selected hashing process applied to second data representing a secure state of the one or more applications executing in the computer system, wherein the second data includes a system memory location indicative of the at least one application executing within the computer system, and further wherein the trusted hash value is encrypted;
comparing the computed hash value with the trusted hash value to determine whether there is unauthorized executable code in the computer system,
wherein the computer system includes a plurality of networked computers, and wherein the encrypted trusted hash value is stored in a secure computer of said plurality of computers, the method further comprising—
receiving in the secure computer, the computed hash value transmitted from at least a first computer; and
decrypting the encrypted trusted hash value in the secure computer,
wherein comparing the computed hash value with the decrypted trusted hash value occurs in the secure computer;
if the computed hash value and the trusted hash value substantially match—
retrieving a password from a memory in the secure computer; and
transmitting the retrieved password to the at least a first computer; and
if the computed hash value and the trusted hash value do not substantially match—
transmitting an incorrect password and/or a lock command to the at least one untrusted application of the at least first computer.

76. A method of detecting unauthorized executable code resident in a computer system, the method comprising:
hashing first data stored in data storage within the computer system using a selected hashing process to determine a computed hash value, wherein the first data includes data representing a current state of at least one application executing within the computer system;
retrieving a trusted hash value, wherein the trusted hash value was created using the selected hashing process applied to second data representing a secure state of the one or more applications executing in the computer system, wherein the second data includes a system memory location indicative of the at least one application executing within the computer system, and further wherein the trusted hash value is encrypted;
comparing the computed hash value with the trusted hash value to determine whether there is unauthorized executable code in the computer system,
wherein the computer system includes a plurality of networked computers, and wherein the encrypted trusted hash value is stored in a secure one of said plurality of computers, and the method further comprises—
receiving in the secure computer, the computed hash value transmitted from at least a first computer;
decrypting the encrypted trusted hash value in the secure computer,
wherein comparing the computed hash value with the decrypted trusted hash value occurs in the secure computer;
if the computed hash value and the trusted hash value substantially match—
retrieving a password from a memory in the secure computer; and
transmitting the retrieved password to the at least first computer; and
if the computed hash value and the trusted hash value do not substantially match—
prompting a user to verify that any unauthorized executable code in the at least first computer is from a known source.

* * * * *

UNITED STATES PATENT AND TRADEMARK OFFICE
CERTIFICATE OF CORRECTION

PATENT NO.         : 7,526,654 B2                                            Page 1 of 1
APPLICATION NO.    : 09/977203
DATED              : April 28, 2009
INVENTOR(S)        : Marc Charbonneau It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 153 days.

should read (*) Notice: Subject to any disclaimer, the term of this patent is extended or adjusted under 35 U.S.C. 154(b) by 822 days.

Signed and Sealed this

Twentieth Day of April, 2010

David J. Kappos
*Director of the United States Patent and Trademark Office*